Sept. 24, 1940.  F. A. BECKER  2,216,064
DISPENSING DEVICE
Filed Nov. 1, 1939  2 Sheets-Sheet 1
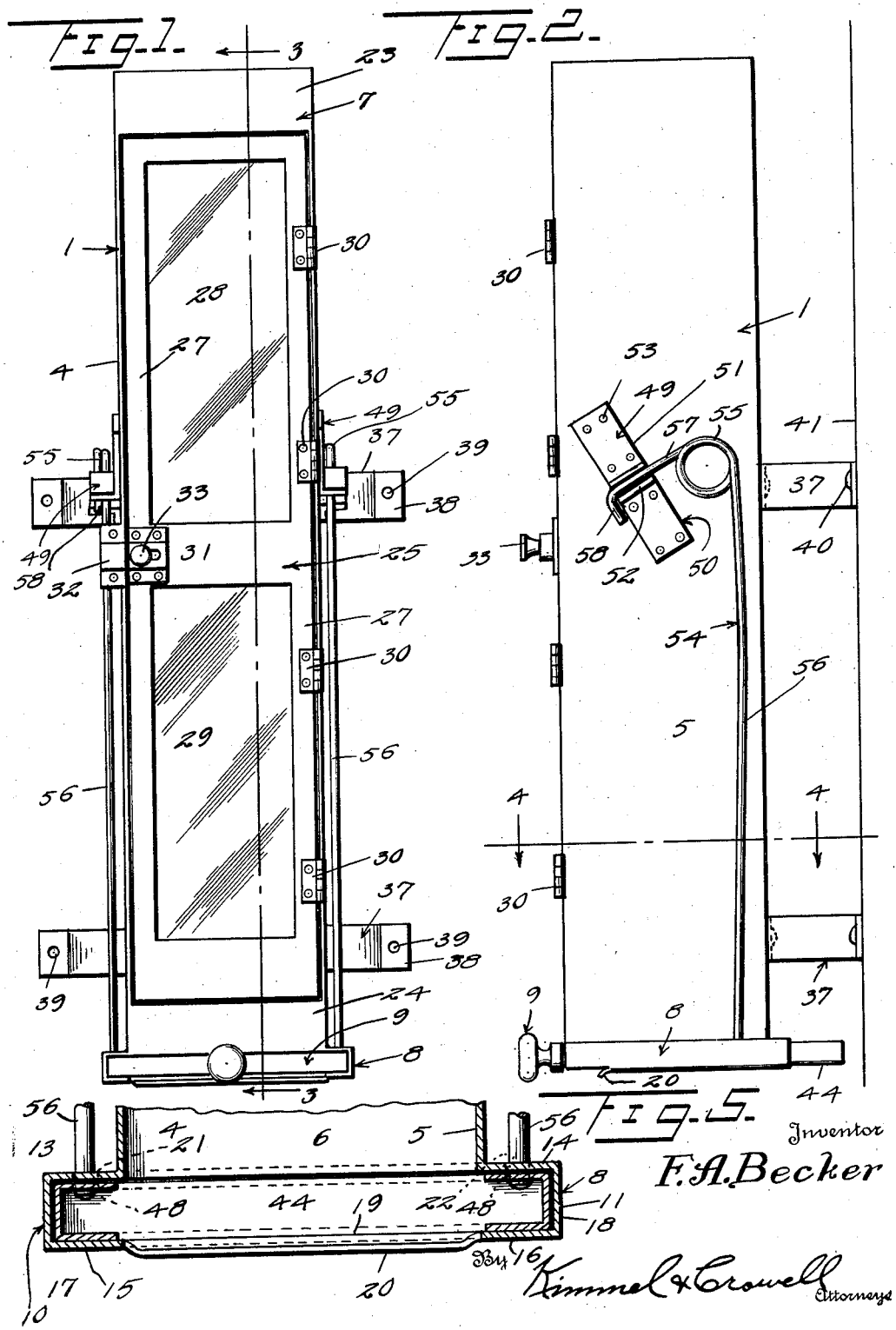
Inventor
F. A. Becker
By Kimmel & Crowell
Attorneys Sept. 24, 1940.  F. A. BECKER  2,216,064
DISPENSING DEVICE
Filed Nov. 1, 1939  2 Sheets-Sheet 2
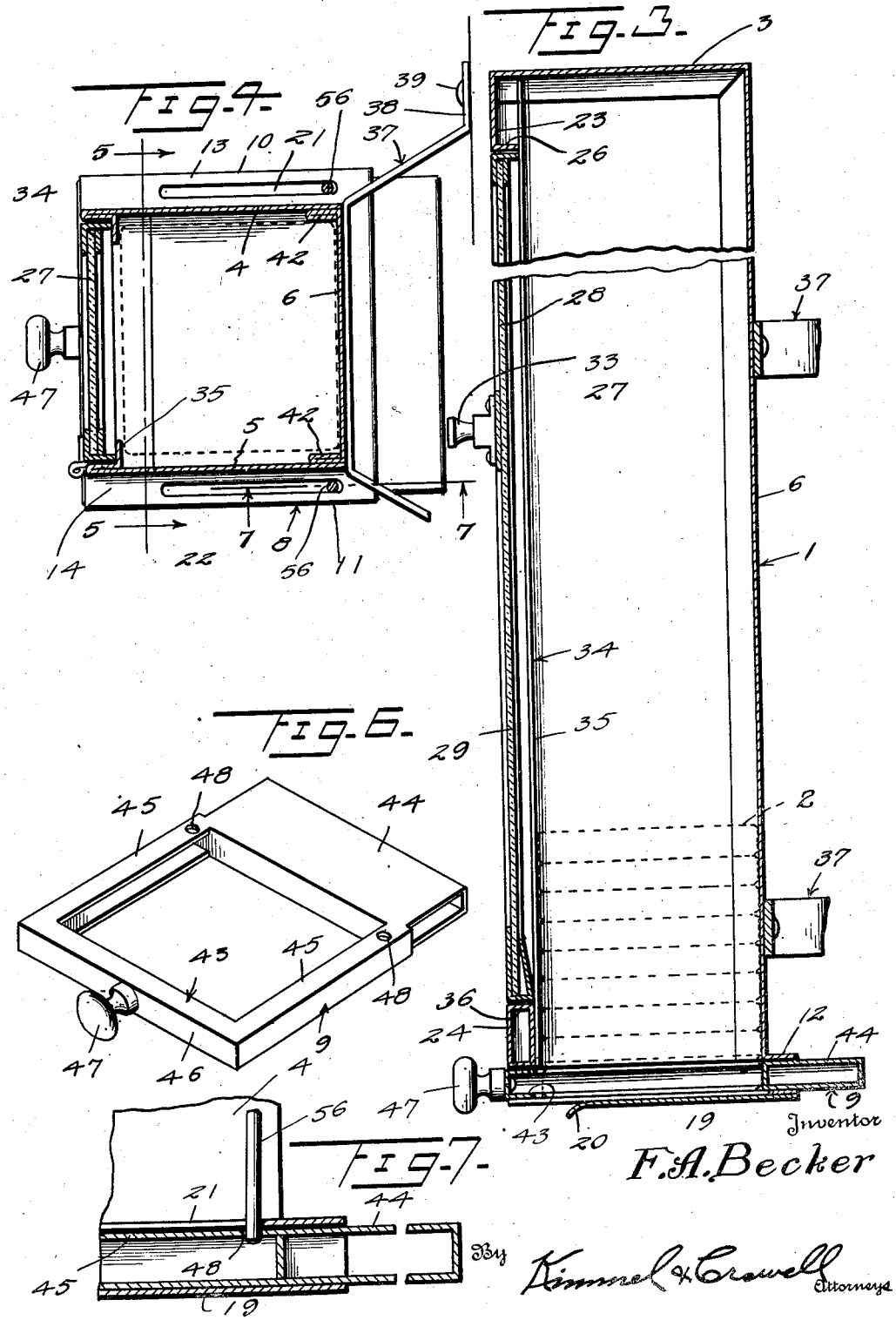

Patented Sept. 24, 1940

2,216,064

UNITED STATES PATENT OFFICE 2,216,064

DISPENSING DEVICE

Fred A. Becker, New York, N. Y.

Application November 1, 1939, Serial No. 302,450

7 Claims. (Cl. 312—67)

This invention relates to a dispensing device and more particularly to a device primarily designed for the storing, displaying and dispensing in a sanitary manner slices of bread, but it is to be understood that a dispensing device, in accordance with this invention is for use in any connection for which it may be found applicable.

The invention aims to provide, in a manner as hereinafter set forth, a device of the class referred to providing when successively operated for independently dispensing therefrom, in a sanitary manner, slices of bread directly onto a plate, tray or other receiver to thereby overcome the direct handling of said slices by waiters, countermen or other assistants employed in restaurants.

The invention further aims to provide, in a manner as hereinafter set forth, a dispensing device for the purpose referred to, which is comparatively simple in its construction and arrangement, strong, durable, compact, pleasing in appearance, expeditiously and conveniently operated for dispensing purposes, capable of ready access thereto for storing therein a stack of bread slices when desired, thoroughly efficient in the use intended therefor, readily assembled and comparatively inexpensive to set up.

Embodying the aims aforesaid and others which may hereinafter appear, the invention consists of the novel construction, combination and arrangement of parts as will be more specifically referred to and as illustrated in the accompanying drawings, wherein is shown an embodiment of the invention, but it is to be understood that changes, variations and modifications may be resorted to which fall within the scope of the invention as claimed.

In the drawings:

Figure 1 is a front elevation of the device,

Figure 2 is an elevation looking towards one side of the device,

Figure 3 is a longitudinal sectional view of the device on line 3—3 Figure 1,

Figure 4 is a transverse sectional view of the device on line 4—4 Figure 2,

Figure 5 is a sectional view of the device on line 5—5 Figure 4,

Figure 6 is a perspective view of the dispensing element of the device, and

Figure 7 is a cross sectional view of the device on line 7—7 Figure 4.

The device includes an upstanding container, generally indicated at 1 and which is of the desired height, width and breadth for storing a stack of the desired height of superimposed slices of bread, that is to say the capacity of the container 1 will be as desired. The container may be of any suitable cross sectional contour to correspond to the contour of the slices of bread, and it is shown by way of example as of squared cross sectional contour to correspond to the contour of slices of bread indicated at 2 and shown by dotted lines in Figure 3. The container 1 is open at its bottom, closed at its top, back and sides and normally closed at its front. The container preferably will be formed of sheet metal of the desired gauge, but it is to be understood that the container may be set up from any suitable material.

The container 1 has its top indicated at 3, its sides at 4, 5, its back at 6 and its normally closed front at 7.

The top 3 is flat and imperforate. The sides 4, 5 are also flat and imperforate. The back 6 is flat and imperforate. The sides 4, 5 and the back 6 merge at their lower ends into a horizontally disposed combined guide and holder element 8 for a slidable dispensing element 9, which will be more fully referred to hereinafter. The element 8 is extended laterally from the sides 4, 5 and rearwardly from the back 6. The front of element 8 aligns with the lower end of the front 7 of the container 1. The element 8 comprises a pair of oppositely disposed inwardly opening channel-shaped parts 10, 11, which are open at their front and rear ends, a coupling part 12 extended rearwardly from the back 6 and connecting the rear end of the upper walls 13, 14 respectively of the parts 10, 11. The walls 13, 14 merge into the lower ends of the sides 4, 5. The coupling part 12 not only merges into the walls 13, 14, but also merges into the lower end of the back 6. The lower walls of the parts 10, 11 are indicated respectively at 15, 16. The outer walls of the parts 10, 11 are indicated respectively at 17, 18. The said lower walls 15, 16 are connected together by a plate 19 having a depending lip 20 at its forward end. The lip 20 is disposed rearwardly of the open front of the element 8. The plate 19 is secured against the lower faces of the walls 15, 16 and is flush with the rear ends thereof. The plate 19 constitutes a support for a slice of bread when the latter is positioned to be dispensed from the container. The walls 13, 14 are provided lengthwise thereof with elongated slots 21, 22 respectively.

The front 7 of the container includes an upper portion 23, a bottom portion 24 and an intermediate portion 25. The latter is of materially greater length than the portions 23, 24. The portion 23 is connected with the top 3 and sides 4, 5 and it is formed at its lower end with an inwardly extending flange 26. The portion 24 is hollow and of rectangular contour in vertical section. The portion 24 is disposed on its lower lengthwise edge and the heighth of such portion is less than the heighth of the portion 23. The portion 24 is connected to the sides 4, 5. The portions 23, 24 have their outer faces flush with the front of the sides 4, 5 and said portions 23, 24 are disposed in alignment. The portion 25 is in the form of a door 27 provided with superposed transparent panels 28, 29. The door 27 is hinged as at 30 with the container side 5. The door 27 carries a latch 31 for engagement with a keeper 32 carried by the container side 4 for the purpose of latching the door in a closed position. When door 27 is closed, it is arranged between container sides 4, 5 and the portions 23, 24 of the front 7 and is also flush with the front edges of the container sides 4, 5 and the outer faces of the portions 23, 24 of the front. The shiftable latching member 33 of the latch 31 constitutes a handle for shifting the door on its hinges to and from closed position.

The container sides 4, 5 have integral therewith and arranged against the forward marginal portions of the inner face of said sides oppositely disposed angle-shaped members 34 constituting side members of a frame for the door 27 and with the legs 35 of the members 34 forming jams or stops for the door 27 on the inward movement thereof. The portion 23 forms the top frame for the door 27 and the portion 24 of the front 7 provides the bottom frame member of the door frame for the door 27. As to portion 23, its flange 26 forms what may be termed the top of the door frame and as to portion 24, its top 36 provides what may be termed the bottom of the door frame.

Secured to the container back 6 and extending rearwardly therefrom are superposed angle shaped brackets 37, each having its ends 38 flat and provided with openings 39 for the passage of holdfast means 40 to secure the device in juxtaposition to a support 41.

The back 6 of the container is provided with forward extensions 42, which are arranged against the inner faces of the container sides 4, 5 at the rear marginal portions of such faces. The extensions 42 constitute spaces for the bread slices relative to the container sides 4, 5. The bread slices 2 are arranged rearwardly of the legs or flanges 35 of the members 34 and these flanges constitute guides.

The expelling element 9 is slidably mounted in the combined guide and holder element 8, and element 9 is spring controlled and such controlling means will be hereinafter referred to. The element 9 consists of an inwardly opening channel-shaped part 43 and a hollow rectangular part 44 secured at its front to the rear ends of the sides 45 of the part 43. The parts 43 and 44 coact to provide a frame for the reception of a slice of bread to be dispensed and when such slice is arranged in the frame, it is supported by the plate 19 or, in other words, the plate 19 provides for the slice of bread to remain in the frame formed by the parts 43, 44 until the element 9 is shifted outwardly to dispense the slice. The bight 46 of the part 43 has attached thereto a knob or handle 47 which is disposed exteriorly of the container 1. The part 43 in proximity to the part 44 is formed with aligned openings 48 in the top portions of the side 45 of the part 43. The normal position of element 9 is as shown in Figure 3 and with the rectangular part 44 extending rearwardly from the element 8. The part 44 constitutes an expeller for a slice of bread and functions when the element 9 is pulled forwardly with respect to the container 1.

Secured to the outer face of each container side is a pair of oppositely disposed aligned spaced angle-shaped brackets 49, 50 disposed at an inclination with respect to said face. Each bracket includes an inner leg 51 and an outer leg 52. The legs 52 extend outwardly at right angles to the inner ends of the legs 51 and are disposed in parallel spaced relation. The legs 51 are secured to a container side by the holdfast means 53. Each pair of said brackets constitutes an anchoring means for one end of a controlling spring 54. The spring 54 intermediate its ends is formed with a plurality of coils 55 and extending from the coils at one end is an elongated depending stretch 56 and extending forwardly from the other end of the coils 55 is a short downwardly inclined stretch 57 having an angularly disposed outer end portion 58. The stretches 57 of the springs 54 extend between the legs 52 of the pairs of brackets 49, 50 and the outer end portions 58 of the stretches 57 bear against the forward side edges of the legs 52 of the brackets 50 and also against the forward side edges of the legs 51 of brackets 50. Each pair of brackets correlates with the stretch 57 to anchor the upper end of the controlling spring 54. The stretches 56 of the springs 54 extend down through the slots 21 and 22 and engage in the openings 48 of the part 43 of the element 9 whereby the latter is spring controlled. The normal action of the springs 54 is to maintain the element 9 in the position shown in Figure 3 and when element 9 is pulled outwardly to dispense a slice of bread it is against the action of the controlling springs 54.

The element 9 is pulled outwardly to an extent whereby the slice of bread will clear the plate 19 and under such conditions the slice will be dispensed and will drop into a tray, plate or other receiver. The part 43 of the element 9, when the latter is pulled outwardly, acts on the slice of bread to shift it bodily with such element 9 to an extent to clear the lips 20 of the plate 19.

The dispensing of the slice of bread from container 1 is had without it being directly handled by an employee of a restaurant and under such conditions provides for sanitation.

What I claim is:

1. In a dispensing device an open bottom upstanding container for the storage of the objects to be dispensed and including a pair of sides, a rear and a front, a horizontally disposed skeleton combined guide and support element extended laterally with respect to and connected to the lower ends of said sides and rear, said element adjacent the lower ends of said sides having its top formed lengthwise thereof with a pair of spaced aligned slots, a horizontally disposed skeleton dispensing element supported by and slidably mounted in the other element and formed in the rear portion of its top with a pair of aligned spaced openings normally registering with the rear end of said slots, and controlling springs for said dispensing element arranged against the outer surfaces of the sides of the container, formed with coils intermediate their ends, elongated stretches depending from one end of the coils through said slots and said openings and an angle-shaped short stretch extended from the other end of the coils and anchored to the sides of the container, said dispensing element being provided with means to facilitate movement of the same outwardly to dispensing position against the action of said springs and said springs acting to return the dispensing element to retracted position when the dispensing operation is completed and the dispensing element is released.

2. The invention as set forth by claim 1 having a part of the front of the container in the form of a transparent door hinged to one side and latchable to the other side of the container, and the container sides being formed with rearwardly directed oppositely angle-shaped parts providing stops for limiting the extent of the closing movement of the door, said parts further constituting combined guides and retainers for the objects within the container to be dispensed.

3. In a dispensing device an open bottom upstanding container for the storage of the objects to be dispensed and including a pair of sides, a rear and a front, a horizontally disposed skeleton combined guide and support element extended laterally with respect to and connected to the lower ends of said sides and rear, said element adjacent the lower ends of said sides having its top formed lengthwise thereof with a pair of spaced aligned slots, a horizontally disposed skeleton dispensing element supported by and slidably mounted in the other element and formed in its top with a pair of aligned spaced openings registering with said slots, and controlling springs anchored at one end against the outer surface of the sides of the container and having their other ends extending through said slots and permanently engaging in said openings, said dispensing element being provided with means to facilitate movement of the same outwardly to dispensing position against the action of said springs and said springs acting to return the dispensing element to retracted position when the dispensing operation is completed and the dispensing element is released.

4. In a dispensing device an open bottom upstanding container for the storage of the objects to be dispensed and including a pair of sides, a rear and a front, a horizontally disposed skeleton combined guide and support element extended laterally with respect to and connected to the lower ends of said sides and rear, said element adjacent the lower ends of said sides having its top formed lengthwise thereof with a pair of spaced aligned slots, a horizontally disposed skeleton dispensing element supported by and slidably mounted in the other element and formed in its top with a pair of aligned spaced openings registering with said slots, controlling springs anchored at one end against the outer surface of the sides of the container and having their other ends extending through said slots and permanently engaging in said openings, said dispensing element being provided with means to facilitate movement of the same outwardly to dispensing position against the action of said springs and said springs acting to return the dispensing element to retracted position when the dispensing operation is completed and the dispensing element is released, the front of said container having a portion thereof in the form of a door hinged to one side and latchable to the other side of the container, and each of the container sides rearwardly of the door being formed with oppositely disposed combined guides and retainers for the objects within the container to be dispensed.

5. In a dispensing device an upstanding container for the storage of the objects to be dispensed and including a closed top, a closed back, a pair of closed sides and a normally closed transparent front, a horizontally disposed combined guide and support element of skeleton form connected to the lower ends of and disposed in outwardly laterally extended relation with respect to said sides and back, said element including a pair of oppositely disposed inwardly opening channel shaped parts open at each end, a coupling part connecting the rear ends of the upper portions of the channel parts together and a plate connecting the major portion of the length of the lower portions of said channel parts together, inset rearwardly with respect to the front ends of said channel-shaped parts and bridging the major portion of the space between the said lower portions, the said upper portion of each of said channel-shaped parts being formed lengthwise thereof with a slot, a dispensing element of frame-like form slidably mounted in the said guide and support element and being formed with a pair of spaced aligned openings registering respectively with said slots, and controlling springs anchored to the sides of the container extending through said slots and permanently engaging in said openings, said dispensing element being provided with means to facilitate movement of the same outwardly to dispensing position against the action of said springs and said springs acting to return the dispensing element to retracted position when the dispensing operation is completed and the dispensing element is released.

6. In a dispensing device an upstanding container for the storage of the objects to be dispensed and including a closed top, a closed back, a pair of closed sides and a normally closed transparent front, a horizontally disposed combined guide and support element of skeleton form connected to the lower ends of and disposed in outwardly laterally extended relation with respect to said sides and back, said element including a pair of oppositely disposed inwardly opening channel shaped parts open at each end, a coupling part connecting the rear ends of the upper portions of the channel parts together and a plate connecting the major portion of the length of the lower portions of said channel parts together, inset rearwardly with respect to the front ends of said channel-shaped parts and bridging the major portion of the space between the said lower portions, the said upper portion of each of said channel-shaped parts being formed lengthwise thereof with a slot, a dispensing element of frame-like form slidably mounted in the said guide and support element and being formed with openings registering respectively with said slots, controlling springs anchored to the sides of the container extending through said slots and permanently engaging in said openings, the front of the container including a door hinged to one side and latchable with the other side of the container, and the sides of the container rearwardly of the door being provided with spaced aligned oppositely disposed combined guides and retainers for the objects to be dispensed, said dispensing element being provided with means to facilitate movement of the same outwardly to dispensing position against the action of said springs and said springs acting to return the dispensing element to retracted position when the dispensing operation is completed and the dispensing element is released.

7. In a dispensing device an upstanding container for the storage of the objects to be dispensed and including a closed top, a closed back, a pair of closed sides and a normally closed transparent front, a horizontally disposed combined guide and support element of skeleton form connected to the lower ends of and disposed in outwardly laterally extended relation with respect to said sides and back, said element including a pair of oppositely disposed inwardly opening channel shaped parts open at each end, a coupling part connecting the rear ends of the upper portions of the channel parts together and a plate connecting the major portion of the length of the lower portions of said channel parts together, inset rearwardly with respect to the front ends of said channel-shaped parts and bridging the major portion of the space between the said lower portions, the said upper portion of each of said channel-shaped parts being formed lengthwise thereof with a slot, a dispensing element of frame-like form slidably mounted in the said other element and being formed with a pair of aligned openings registering with said slots, controlling springs anchored to the sides of the container extending through said slots and permanently engaging in said openings, the front of the container including a door hinged to one side and latchable with the other side of the container, the sides of the container rearwardly of the door being provided with spaced aligned oppositely disposed combined guides and retainers for the objects to be dispensed, and spaced parallel spacing means on the inner faces of the sides of the container rearwardly of said combined guides and retainers, said dispensing element being provided with means to facilitate movement of the same outwardly to dispensing position against the action of said springs and said springs acting to return the dispensing element to retracted position when the dispensing operation is completed and the dispensing element is released.

FRED A. BECKER.